United States Patent [19]

Salmon

[11] Patent Number: 4,645,257

[45] Date of Patent: Feb. 24, 1987

[54] FOOT PODS

[76] Inventor: Michael E. Salmon, 2622 Makin, Flint, Mich. 48504

[21] Appl. No.: 734,472

[22] Filed: May 15, 1985

[51] Int. Cl.$^4$ ............................................. B62J 25/00
[52] U.S. Cl. ....................................................... 296/75
[58] Field of Search .............. 296/75, 177, 203, 31 P, 296/1 B; 180/90.6, 182, 210; 280/291; 104/53; D15/15; D21/128, 242, 247, 250

[56] References Cited

U.S. PATENT DOCUMENTS

| | | | |
|---|---|---|---|
| 3,275,094 | 9/1966 | Kennedy | 74/564 |
| 3,450,429 | 6/1969 | Stata | 180/90.6 |
| 4,351,562 | 9/1982 | Twitchwell | 180/79.1 |
| 4,516,648 | 5/1985 | Berger et al. | 180/210 |

FOREIGN PATENT DOCUMENTS

| | | | |
|---|---|---|---|
| 95259 | 7/1923 | Austria | 296/75 |
| 95260 | 7/1923 | Austria | 296/75 |
| 2521939 | 8/1983 | France | 296/177 |
| 731074 | 6/1955 | United Kingdom | 296/177 |
| 2093774 | 9/1982 | United Kingdom | 296/75 |

Primary Examiner—Robert B. Reeves
Assistant Examiner—Carol L. Olson
Attorney, Agent, or Firm—Burton, Parker & Schramm

[57] ABSTRACT

Foot pods in a vehicle having a seated occupant which provide a footrest for various size people without necessitating the movement of the seat. The foot pods are made of a series of transverse V-shaped grooves generally perpendicular to the occupant's leg which are formed in a recess in the body of the vehicle.

8 Claims, 2 Drawing Figures

FOOT PODS

DESCRIPTION

1. Field of Invention

This invention relates to the field of vehicle footrests and more particularly to vehicle footrests formed by an indentation integrally formed in the vehicle body.

2. Background of Invention

Many common vehicles which do not have foot controls such as snowmobiles, lawn mowers, golfcarts and wheel chairs, must design a seat and footrest combination to accommodate occupants of a wide variety of sizes. In a straddle seat vehicle, such as a snowmobile, the occupant's foot location is relatively constant and a larger person would merely move further back on the seat. In other vehicles with an upright seat, either the seat is moved fore and aft or the footrest is moved relative to the seat if adjustment is necessary.

It is the object of this invention to provide a footrest which can be used with a fixed upright seat to accommodate users of a wide variety of sizes without the need for seat adjustment.

It is the further object of this invention to comfortably retain the occupant's feet in a fixed longitudinal and transverse position so that the occupant's feet do not slide about the vehicle when in motion.

It is the further object of this invention to provide foot pods which can be integrally formed in the body of a vehicle and are aesthetically pleasing.

Additional objects and features of the invention will be apparent from the following description in which reference is made to the accompanying drawings.

SUMMARY OF INVENTION

This invention relates to a foot pod to be used in a vehicle having a seated occupant whose feet are desired to be maintained in a stationary position. The foot pod is formed of a recessed indentation having a plurality of V-shaped grooves extending generally perpendicular to the occupant's leg and the transverse axis of the vehicle. The seated occupant may place his feet in the V-shaped groove which is most comfortable. Embodiments of the invention may also include sidewalls extending longitudinally adjacent to each side of the V-shaped grooves further providing transverse support for the user's foot.

BRIEF DESCRIPTION OF THE PREFERRED EMBODIMENT

Figure 1:
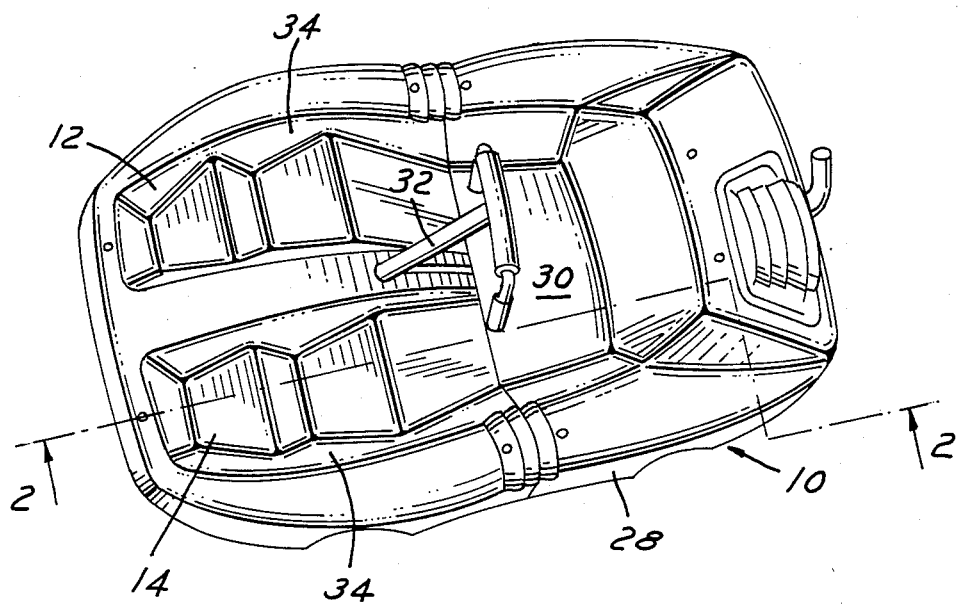
FIG. 1 is a perspective top view of a vehicle provided with a pair of foot pods.
Figure 2:
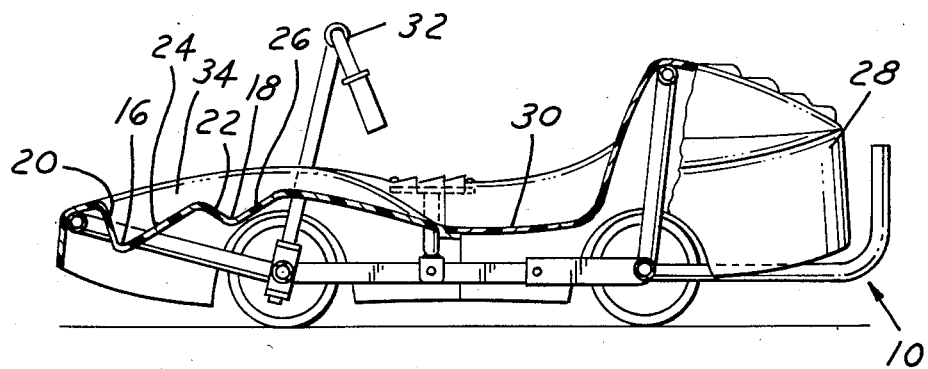
FIG. 2 is a cross-sectional side view taken along line 2—2 in FIG. 1.

Referring to the drawings, FIG. 1 shows a perspective top view of a small go-cart-like motorized vehicle 10 provided with a pair of foot pods 12 and 14. The left foot pod 14 shown in cross-section in FIG. 2 is provided with two V-shaped grooves 16 and 18. The V-shaped grooves run generally perpendicular to the longitudinal axis of the vehicle and are likewise generally perpendicular to the leg of the vehicle's occupant. The V-shaped grooves are defined by a front surface 20 and 22 which is inclined relative to the seated occupant and a rear surface 24 and 26 which declines relative to the seated occupant.

Vehicle 10 as shown in the drawings is made up of a vehicle chassis to which is affixed a contoured body 28. Footrest 12 and 14 are formed as recesses integrally in the body 28. Also formed integrally in the body is seat 30 which is fixed and not adjustable. When the vehicle occupant sits in seat 30, one leg is placed on each side of steering column 32 so that one foot rests in each foot pod. A short occupant would place his feet in the rear V-shaped groove 18 so that the heel portion of the foot would rest upon surface 22 and the back of the heel and Achilles tendon portion of the lower leg would rest upon rear surface 26. The included angle of the V-shaped groove can vary substantially, but preferably it is in the range of 80° to 120°. Angles significantly less than 80° or greater than 120° will result in an uncomfotable orientation of the occupant's ankle or less than desirable heel support.

In the preferred embodiment of the vehicle shown, there are two separate foot pods for each of the occupant's feet. This is partially necessitated by the fact that the occupant must straddle the steering column. With a different steering column orientation, it could be possible to make a single wide foot pod capable of accommodating both of the occupant's feet, side by side. Preferably each foot pod is provided with a pair of longitudinal side walls extending the length of the foot pod along each side of the V-shaped groove. Longitudinal side walls 34 retain the occupant's feet in the foot pod and prevent transverse movement relative to the vehicle.

Since the V-shaped grooves in the foot pod which are located the furthest from the seat will be used by the larger occupants, it is preferable to make those V-shaped grooves deeper to accommodate the larger feet of those long-legged occupants. Ideally, the foot pods will become progressively deeper the farther they are located from the seat. While the vehicle shown is only provided with two V-shaped grooves in each foot pod, the foot pods in other situations may be provided with many more V-shaped grooves to accommodate a wider range of occupant sizes. In addition to V-shaped grooves becoming deeper as they are located farther from the seat, it is also preferable to make the V-shaped groove lower relative to the seat, i.e., closer to the vehicle road surface so the vehicle occupant's legs are lowered so as to not interfere with vehicle steering.

It will be understood, of course, that while the forms of this invention herein shown and described constitute preferred embodiments in the invention, it is not intended to illustrate all the possible forms of the invention. It will be also understood that the words used are words of description rather than limitation and that various changes may be made without departing from the spirit and scope of the invention herein disclosed.

I claim:

1. In a vehicle for a seated occupant having a body surface forward of the seat, a pair of foot pods each comprising a recessed indentation integrally formed in the vehicle body surface having a plurality of transverse V-shaped grooves extending generally perpendicular to the leg of an occupant seated in the seat for support of the occupant's foot at various distances in front of the seat, and a pair of side walls extending longitudinally on each side of the V-shaped grooves to limit transverse movement of the occupant's foot, whereby different size occupants can comfortably sit on the seat by positioning their foot in the V-shaped groove which is most comfortable.

2. The food pods of claim 1 wherein the V-shaped grooves are stair-stepped with the grooves located further from the seat progressively lower in the vehicle and the V-shaped groove is deeper to accommodate a larger foot.

3. The invention of claim 1 wherein the V-shaped grooves of the foot pods are defined by a rear declining surface and a front inclining surface relative to the vehicle's occupant, said surfaces being mutually oriented to define an included angle ranging from 80° to 120°.

4. The foot pod of claim 3 wherein the V-shaped grooves become progressively deeper the further the location from the vehicle occupant.

5. An automotive vehicle body characterized by the body shell being itself shaped to provide in combination: a forwardly facing occupant seat; a recessed indentation extending longitudinally of the body in front of the seat constituting a foot pod; a series of upwardly opening generally V-shaped foot rests in the pod extending transversely of the vehicle body with the foot rest farthest from the seat being deeper than a foot rest closer to the seat; the foot pod having side walls extending longitudinally of the body and along opposite ends of the foot rests to limit transverse movement of an occupant's foot.

6. The invention defined by claim 5 wherein the occupant's seat is fixed in the body, and the V-shaped foot rests are fixed relative to the seat.

7. The invention defined by claim 6 wherein there are a pair of said pods, one for each leg of an occupant of the seat.

8. The invention defined by claim 5 wherein there are a pair of said pods, one for each leg of an occupant of the seat.

* * * * *